Figure 1:
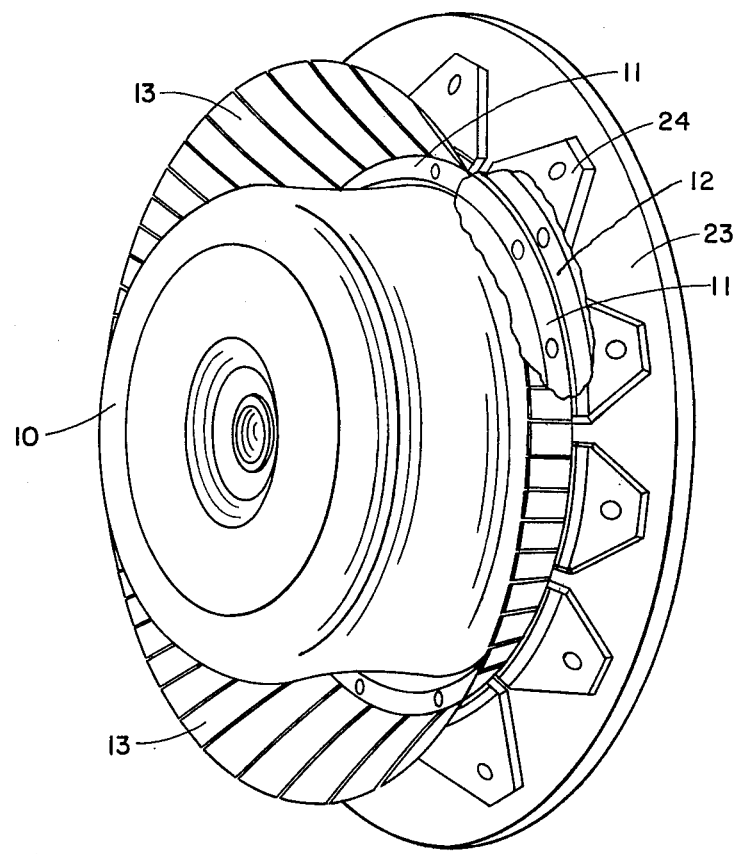

United States Patent [19]

McGaughey

[11] 4,238,268
[45] Dec. 9, 1980

[54] TIRE BUILDING MACHINE PLY TURN-DOWN FINGER ASSEMBLY

[75] Inventor: Robert S. McGaughey, Indiana, Pa.

[73] Assignee: McCreary Tire and Rubber Company, Indiana, Pa.

[21] Appl. No.: 10,038

[22] Filed: Feb. 7, 1979

[51] Int. Cl.³ .............................................. B29H 17/22
[52] U.S. Cl. .................................... 156/398; 29/437; 29/450; 156/401; 156/403; 269/275; 428/53
[58] Field of Search ............... 156/398, 399, 400, 401, 156/402, 403, 414–420; 29/434, 436, 437, 445, 450, 451; 428/53; 269/263, 275, 281

[56] References Cited

U.S. PATENT DOCUMENTS

| | | | |
|---|---|---|---|
| 2,998,049 | 8/1961 | Winslow | 156/401 |
| 3,438,832 | 4/1969 | Cantarutti | 156/401 |
| 3,560,301 | 2/1971 | Cantarutti | 156/401 |
| 3,676,261 | 7/1972 | Appleby et al. | 156/403 |
| 3,728,194 | 4/1973 | Enders | 156/400 |
| 3,772,125 | 11/1973 | Leblond | 156/400 |
| 3,862,874 | 1/1975 | Hopper et al. | 428/53 X |

OTHER PUBLICATIONS

"NRM Corporation Model 88D38–Tire Building Machine", Columbiana, Ohio, Title page, Table of Contents, pp. TM-500 and 8-11.

*Primary Examiner*—John E. Kittle
*Attorney, Agent, or Firm*—Buell, Blenko, Ziesenheim & Beck

[57] ABSTRACT

The ply turn-down fingers are mounted between an inner and outer ring. One ring being formed of an elastomer having mechanical properties of those of rubber and plastic. To remove a finger, the mounting screws nearest the fingers turn-down each side thereof and are removed. The elastomer ring is then bent or distorted away from the finger a distance to free its toe and the finger is withdrawn. A replacement finger is inserted in the same way. The operation can be carried out without freeing the adjacent fingers.

5 Claims, 2 Drawing Figures

U.S. Patent

Dec. 9, 1980

4,238,268

TIRE BUILDING MACHINE PLY TURN-DOWN FINGER ASSEMBLY

This invention relates to tire making or building machinery. It is more particularly concerned with the fingers which turn down the tire plies at each end of the tire carcass to permit a bead ring to be applied.

In the manufacture of tires for automobiles and the like successive plies of rubber and other materials are built up on a radially collapsible rotating mandrel. Those plies extend over the ends of the mandrel and must be turned down to permit the application of a bead ring. Subsequently, some or all the plies are turned up around the ring and back over the carcass. The operation of turning down the plies is conventionally carried out by a plurality of narrow projections or fingers positioned side-by-side around a ring and attached to the ring at their roots or base. Mechanism is provided for moving the ring assembly toward and away from an end of the carcass. When the ring is retracted, the fingers extend outwardly at angles of about 45° with the ring axis, forming a funnel-shaped structure with its wide end adjacent the tire carcass. As the ring is moved toward the tire carcass, an overriding mechanism causes the fingers to close, pushing the extended ply ends downwardly and inwardly. The bead ring is applied against the turned down plies and the ring assembly is moved away from the carcass.

In one form of apparatus the fingers are flat lengths of spring steel, their shank ends clamped between an inner and an outer mounting ring. To prevent the fingers from being pulled out of their mounting, the extreme lower end of each is bent inward at 90 for a distance of about ¼" to form a toe, so as to be locked under the inner ring as well as between that ring and the outer assembly ring. The inner and outer rings are held together by screws positioned about 30° apart or thereabouts. The rings are conventionally steel. If a finger breaks or must be removed for any other reason, all the screws have to be taken out and the rings separated. This is a tedious procedure. As there may be 40 or more fingers in an assembly, it is also troublesome to reassemble the fingers.

It is a principal object of my invention to provide a turn down finger assembly which permits rapid removal and replacement of a finger without completely dismantling and reassembling the mounting rings. Other objects of my invention will appear in the course of the description of my invention which follows.

In my apparatus at least one of the mounting rings for the fingers is made of an elastomer, preferably one having mechanical properties intermediate those of rubbers and plastics. When a finger is to be removed, the mounting screws nearest the finger on each side thereof are removed. The elastomer ring is then bent or distorted radially away from the finger a distance sufficient to free its toe, and the finger is withdrawn. A replacement finger is inserted in the same way. The operation can be carried out without freeing adjacent fingers.

An embodiment of my invention presently preferred by me is illustrated in the attached figures to which reference is now made.

Figure 2:
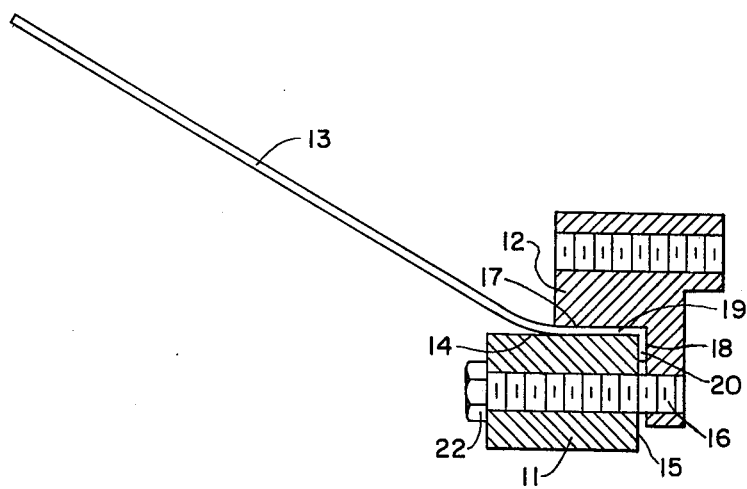

FIG. 1 is a three-quarter end elevation view, partially broken away, of a portion of a tire building machine provided with a turn down finger assembly of my invention, shown in its open or retracted position; and FIG. 2 is a partial cross section through the assembly of my invention, taken on a diameter thereof.

A form of tire building machine equipped with ply turn-down fingers is disclosed in U.S. Pat. No. 3,438,832, granted Apr. 15, 1969 to A. Cantarutti. The fingers there shown, however, are not spring fingers but are pivotally mounted. In FIG. 1 hereof the deflated bladder assembly 10 is similar to that of the Cantarutti patent. Surrounding bladder assembly 10 and movable axially with respect thereto is a spring finger ply down assembly comprising concentric inner ring 11 and outer ring 12 which betweem them clamp a plurality of spring fingers 13, as is best shown in FIG. 2. Inner ring 11 is of rectangular cross section having an outer cylindrical surface 14 and a flat bottom face 15. Outer ring 12 is formed with an inwardly projecting radial flange 16 spaced intermediate its plane faces so as to form an annular recess having an inner cylindrical surface 17 of diameter slightly greater than the diameter of cylindrical surface 14 and a flat annular face 18 normal thereto, which is one face of flange 16. Inner ring 11 fits into the annular recess in outer ring 12 above described.

Spring fingers 13 are flat strips of spring steel having a length several times their width and are clamped at their shank ends 19 between the surface 14 of inner ring 11 and the surface 17 of outer ring 12. The shank portion 19 is bent on a relatively large radius with respect to the major portion of the finger 13 so as to form an angle of about 30° to 45° therebetween. At the extreme end of shank 19 is a toe portion 20 bent normal to shank 19 and away from the major portion of spring fingers 13. Toe 20 is clamped between end face 15 of inner ring 11 and face 18 of flange 16 of outer ring 12. Rings 11 and 12 are held together by a plurality of screws 22 through holes in inner ring 11 into tapped holes in flange 16 of outer ring 12.

Surrounding the assembly of spring fingers 13 above described is an annular member 23 movable axially with respect to inner and outer spring finger rings 11 and 12. Shoes 24 are attached around the inner edge of member 23 which bear upon spring fingers 13 when member 23 is moved axially with respect to rings 11 and 12 toward an end of the tire body, causing the spring fingers 13 to bend inwardly and turn down the tire plies extending over the end of the tire building machine mandrel.

A considerable number of spring fingers 13 is so mounted, as is shown in FIG. 1, the spring fingers being uniformly spaced from each other around the adjoining circumferences of inner ring 11 and outer ring 12. For their assembly inner ring 11 and outer ring 12 are separated. When a spring finger breaks, or must be removed for any other reason, it has heretofore been necessary to disassemble inner ring 11 from outer ring 12, which have conventionally both been made of steel. All screws 22, therefore, had to be removed and then replaced.

In the preferred embodiment of my apparatus herein described, inner ring 11 is made of a relatively stiff elastomer. The rings for passenger vehicle tire bodies are adequately clamped together with 12 screws 22 uniformly spaced around their circumference. When a spring finger must be removed, it is only necessary to remove the screws 22 on each side of that finger. The portion of inner ring 11 so freed is manually bent radially inward a distance sufficient to free toe 20 of the finger, which finger is then lifted axially out of the gap so formed, and a new finger is inserted in the same way. The inner ring 11 returns to its original contour when the deforming force is removed, and the screws 22 which were withdrawn are put back in their places.

I prefer to form inner ring 11 of a polyester elastomer which has mechanical properties intermediate those of rubbers and plastics. A satisfactory elastomer of this type is one having a minimum Durometer A hardness value of about 85 and a maximum Durometer D hardness value of about 60. A commerically available elastomer having such properties is Dupont's "Hytrel."

In my preferred embodiment of my invention herein described I make the inner ring 11 of a polyester elastomer. The outer ring 12 is steel. However, my invention also comprehends an assembly in which the outer ring 12 is an elastomer and the inner ring 11 is steel.

In the foregoing specification I have described presently preferred embodiments of my invention; however, it will be understood that my invention can be otherwise embodied within the scope of the following claims.

I claim:

1. In a ply turn-down finger assembly for a tire building machine comprising an outer ring, an inner ring secured to the outer ring by a plurality of fasteners and a plurality of spring fingers, each having a shank end of toe thereon, positioned around the rings and clamped therebetween at their shank ends with toes turned under the inner ring, the improvement comprising at least one said ring being formed of an elastomer, whereby an individual spring finger is removed and replaced by loosening only the said fasteners adjacent said finger and deforming said elastomer ring in that region only sufficiently to release the shank and toe of that finger and to accept the shank and toe of a replacement finger.

2. The assembly of claim 1 in which the elastomer ring is the inner ring.

3. The assembly of claim 1 in which the elastomer is a polyester elastomer.

4. The assembly of claim 1 in which the elastomer has mechanical properties intermediate those of rubbers and plastics.

5. The assembly of claim 4 in which the elastomer has a minimum Durometer A hardness of about 85 and a maximum Durometer D hardness of about 60.

* * * * *

UNITED STATES PATENT AND TRADEMARK OFFICE
CERTIFICATE OF CORRECTION

PATENT NO. : 4,238,268
DATED : December 9, 1980
INVENTOR(S) : ROBERT S. McGAUGHEY It is certified that error appears in the above-identified patent and that said Letters Patent are hereby corrected as shown below:

Column 1, line 34, "90" should be --90°--.

Claim 1, column 4, line 1, after "end", "of" should be --and--.

Signed and Sealed this

Tenth Day of March 1981

[SEAL]

Attest:

RENE D. TEGTMEYER

Attesting Officer — Acting Commissioner of Patents and Trademarks